June 9, 1953     W. L. EDEL     2,641,003
EVAPORATOR FOR UNIFORM PRESSURE
ABSORPTION TYPE REFRIGERATORS
Filed March 26, 1949     2 Sheets-Sheet 1

Inventor
WALTER L. EDEL
By Arthur H. Robert
Attorney

INVENTOR.
WALTER L. EDEL
BY Arthur H. Robert

Patented June 9, 1953

2,641,003

UNITED STATES PATENT OFFICE 2,641,003

EVAPORATOR FOR UNIFORM PRESSURE ABSORPTION TYPE REFRIGERATORS

Walter L. Edel, Louisville, Ky., assignor to Clayton & Lambert Manufacturing Company, Louisville, Ky., a corporation of Delaware Application March 26, 1949, Serial No. 83,631

22 Claims. (Cl. 62—99)

This invention relates to uniform pressure absorption type refrigerators and to evaporators therefor, which are assumed herein to utilize an ammonia, hydrogen and water system although other suitable systems may be employed.

In its broadest aspect, the invention is applicable to various uniform pressure absorption type refrigerator arrangements but, for the sake of clarity, it is hereinafter described in connection with, but not necessarily limited to, a refrigerator comprising: (1) a cabinet having an insulated freezing compartment for the storage of frozen foods, and a separately insulated chilling compartment for the storage of unfrozen foods; (2) an elongate tube forming an elongate evaporator containing a freezing portion for the freezing compartment and a chilling portion for the chilling compartment, each being bonded, or otherwise placed in direct physical heat transfer relationship with one or more walls of its respective compartment; and (3) incoming ammonia liquid and hydrogen gas feed lines, both of which are bonded to the elongate evaporator in order to precool these incoming fluids before they enter the freezing portion thereof.

It is highly desirable to provide an elongate evaporator capable of producing, in its freezing portion, extremely low operating temperatures, the lower the better, and, in its chilling portion, operating temperatures low enough to keep the chilling compartment air temperature below the recommended maximum of 46° F. without being so low as to cause frost to form in the chilling compartment. It is, however, somewhat difficult to achieve these objectives satisfactorily, and particularly difficult to maintain the chilling compartment air temperature below the recommended maximum without having, in the chilling portion of the evaporator, operating temperatures which are objectionably low.

The principal object of this invention is to provide means for raising the operating temperatures in the colder part of the chilling portion without either raising the chilling compartment air temperature itself, or otherwise reducing the amount of useful refrigeration in that compartment.

Another important object of the invention is to raise the operating temperatures produced by the colder part of the chilling portion while lowering the operating temperatures produced by the warmer part thereof sufficiently to maintain the same average chilling compartment air temperature and the same quantity of refrigeration.

A further object is to accomplish the foregoing objectives in a simple, inexpensive manner.

I have found that the foregoing objects may be attained by dividing the gas stream within the colder part of the chilling portion, or chilling evaporator, into an active portion which flows over the surface of the liquid ammonia in the colder part so as to be available for useful refrigeration, and an inactive portion which is shielded from contact with the liquid ammonia, and by reuniting both streams in a warmer part of the chilling evaporator to form a single active stream whereby the unspent capacity of the fresh gas is made available for useful refrigeration.

With this divided arrangement, it will be obvious that the ability or capacity of the divided colder part of the chilling evaporator to absorb heat from its surroundings is reduced. Since only a part of the total gas is exposed to the liquid ammonia, in the colder part of the evaporator, a corresponding part of the available heat at the available temperature potential will evaporate enough ammonia into the active gas to produce partial pressures equal to those normally produced in this part of the evaporator without any division of the gas stream. The remainder of the available heat will therefore be effective in raising the operating temperature of the ammonia and increasing its partial pressures. In the warmer part of the chilling evaporator, the active gas enters with partial pressures much higher than that of the inactive gas. As these two gases join and diffuse into each other there is a rapid lowering of the partial pressures of the ammonia vapor which obviously results in a lowering of the operating temperatures of the liquid ammonia and effects a corresponding increase in the ability or capacity of this part to absorb heat. As a consequence, the capacity of the chilling evaporator and the operating temperature gradient of the liquid ammonia flowing through it are both leveled off. Necessarily, the unused refrigerating potential of the gas in the colder part is fully utilized in the warmer part so that the quantity of useful refrigeration remains the same.

It is also desirable to reduce the temperatures of the incoming ammonia liquid and hydrogen gas down to values as low as possible in order to secure the lowest attainable operating temperatures in the freezing portion or freezing evaporator. To this end, I have heretofore proposed bonding these incoming fluid feed lines to the chilling evaporator. However, where the operating temperatures in the colder part of the chilling evaporator have been raised, as by dividing the gas stream in the manner above indicated, the ability of the chilling evaporator to precool the incoming fluids is correspondingly lost. It is desirable, therefore, to regain this lost precooling effect without introducing heat into the freezing evaporator.

Another object of the invention is to provide, in an evaporator having a chilling portion whose temperature gradient has been leveled off, a novel arrangement for precooling the incoming fluids to a desirably low degree.

I have found that this objective may be accomplished by connecting the gas outlet of the freezing evaporator to the gas inlet of the chilling evaporator through an elongate intermediate portion and by bonding the incoming feed lines to this intermediate portion in countercurrent relationship therewith. Lower operating temperatures are thus produced in the freezing evaporator, since the heat taken from these incoming lines is not permitted to enter it. Furthermore, while this heat is introduced into the evaporator as a whole in advance of the chilling evaporator portion, the operating conditions of the chilling evaporator are not deleteriously affected because the same heat content, with or without precooling, necessarily enters the system in advance of and ultimately passes through the chilling evaporator.

The invention is illustrated in the accompanying drawing wherein.

Figure 4:
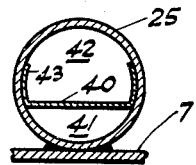
Figure 5:
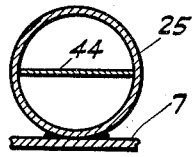
Figure 6:
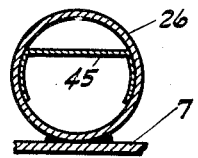
Figure 3:
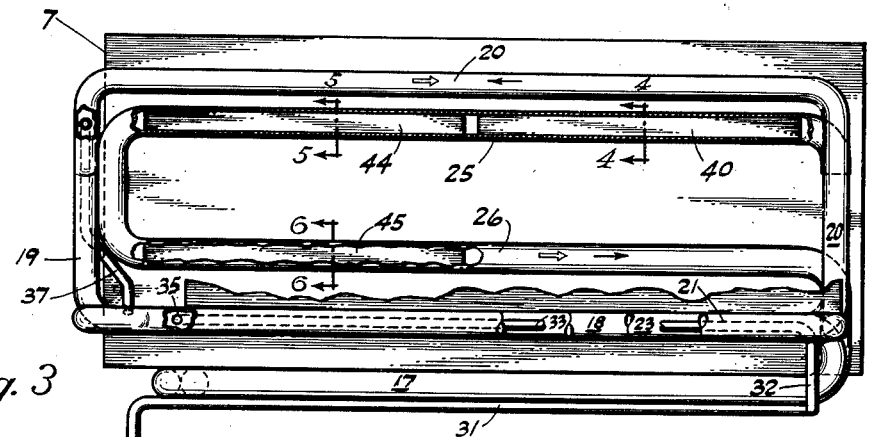
Figure 2:
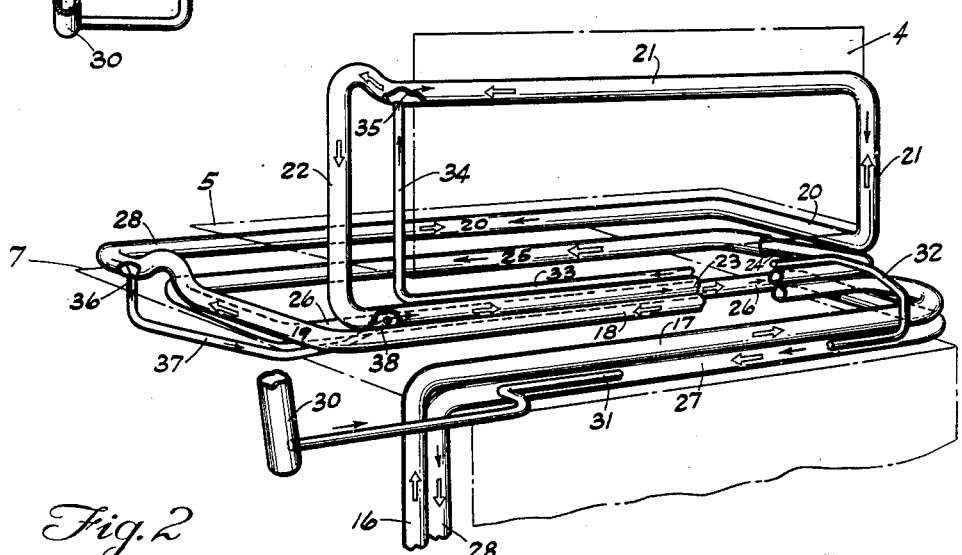
Figure 2 is a perspective view showing the elongate evaporator of Figure 1 with all insulation and cabinet parts omitted except the compartment walls in contact with the evaporator.

Figure 3 is a top plan view of the elongate evaporator as shown in Figure 2, with its chilling portion partly broken away; and Figures 4, 5 and 6 are sectional views respectively taken along lines 4—4, 5—5 and 6—6 of Figure 3.

As illustrated, the refrigerator comprises: a cabinet; and a refrigerating mechanism.

The cabinet 1 has: an insulating front door 2 providing access to an unobstructed freezing compartment 3 formed by appropriate walls, including rear and bottom walls 4 and 5, and an unobstructed chilling compartment 6 formed by appropriate walls, including top wall 7, the walls 4, 5 and 7 being composed of heat conductive material, preferably metal, and the top wall 7 sloping downwardly in the rearward direction so that the space between it and the horizontal bottom wall 5 increases in height from the front to the rear of the refrigerator; and suitable heat insulating material 8 completely surrounding the compartments except at their open door insulated front ends. The bottom face of top wall 7 may, if desired, be provided with metal fins for heat transfer purposes.

Figure 1:
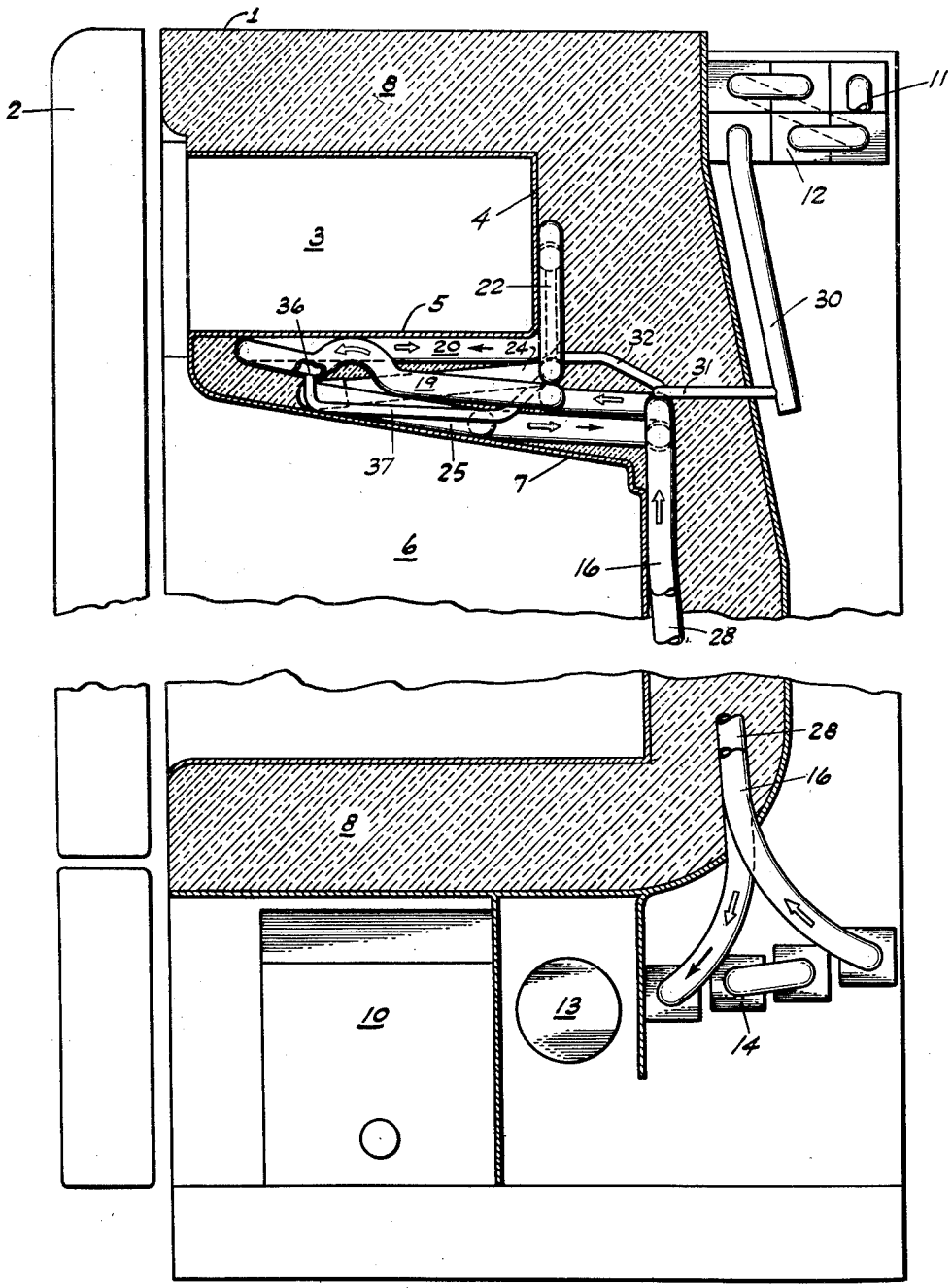
Figure 1 is a vertical sectional view of one embodiment of the invention with the refrigerator cabinet shown more or less in outline, the insulation in section, and the refrigerating mechanism partly in side elevation and partly in outline, this mechanism including an elongate evaporator constructed in accordance with my invention.

The refrigerating mechanism shown in Figure 1 conventionally comprises: a generating mechanism 10 arranged to receive strong liquor through one line not shown, and to deliver both weak liquor through another line not shown and generated vapor through line 11, which is indicated only at the upper right-hand corner of Figure 1; a fluid-cooled ammonia condenser 12 to receive and condense the vapor from line 11; a receiver 13 which delivers strong liquid to the generating mechanism through a line not shown; a fluid cooled absorber 14 to receive weak liquor from the generator and deliver strong liquor to the receiver through lines not shown; an elongate gas tube having, in the direction of gas flow, sections 16—19 forming the incoming hydrogen gas feed line, sections 20—26 forming the elongate evaporator, and sections 27—29 forming the outgoing heavy mixed gas line; and an ammonia feed line having sections 30—34 leading to the feed point 35.

Sections 16 and 17 of the incoming hydrogen gas line form part of the heat exchanger which is conventionally arranged between the absorber and the elongate evaporator. Heat exchanger section 16 extends upwardly along the near side of the refrigerator (see Figures 1 and 2) to a level between compartment walls 5 and 7, where it connects with heat exchanger section 17 which extends horizontally across the refrigerator to the far side and then turns horizontally forward along the far side to connect into section 18. Section 18 extends from the far side horizontally across the refrigerator to the near side, where it turns horizontally forward to connect into the section 19 which slants forwardly and upwardly along the near side to the front corner of the bottom wall 5 where it is upwardly humped just before its connection with section 20 of the elongate evaporator.

The elongate evaporator sections 20—26 not only form conventional freezing and chilling portions or evaporators but, in accordance with my invention, also form an elongate intermediate portion arranged between and connected in series with the freezing and chilling evaporators. The freezing and chilling evaporators are outside of their respective compartments but are welded, brazed or otherwise placed in direct physical heat transfer relationship with the adjacent walls thereof. The intermediate portion is outside of the freezing and chilling compartments and insulated from both. While the hydrogen gas and ammonia liquor could be fed to the upper end of the freezing evaporator, the elongate evaporator arrangement illustrated is one in which the hydrogen gas and ammonia liquor are initially fed to opposite (lower and upper) ends of the freezing evaporator to flow in countercurrent relationship, and the resulting mixed gas and partially evaporated ammonia liquor are finally fed to the upper end of the intermediate portion to flow in concurrent relationship serially through the intermediate portion and the chilling evaporator. The particular manner in which these sections extend is explained hereinafter as follows:

In the freezing evaporator, freezing section 20 extends from its connection with section 19 horizontally across the bottom face of bottom wall 5 near its front edge to the far side of the refrigerator, thence rearwardly on the far side along the side edge of bottom wall 5 to the rear edge thereof where it connects with freezing section 21 which projects upwardly along the far side edge of the rear wall 4 and then turns to extend horizontally along the upper edge of rear wall 4 across the refrigerator to the near side thereof. At the near side, and adjacent feed point 35, freezing section 21 joins into section 22 which connects the upper end of the freezing evaporator with the upper end of the intermediate portion. Connector section 22 is upwardly humped adjacent feed point 35 to prevent any liquid ammonia from entering it. It extends from its hump downwardly along the near side of the refrigerator to a level slightly below the freezing compartment bottom wall 5, where it joins into section 23 of the intermediate portion.

In the elongate intermediate portion, the upper end of intermediate section 23 extends from the lower end of connector 22 horizontally across the refrigerator to the far side and then turns forwardly into intermediate section 24 which slants forwardly downward on the far side of the refrigerator to the front end thereof, where it connects into section 25 at the upper end of the chilling evaporator.

In the chilling evaporator, section 25 extends horizontally across the refrigerator from its far side connection with section 24 of the intermediate portion to the near side of the refrigerator and then extends rearwardly and slants downwardly on the near side along the top wall 7 of the chilling compartment for a suitable distance where it again turns to extend horizontally across the refrigerator to the far side and then turns rearwardly along the far side edge of top wall 7 to the rear edge thereof where it connects to the outgoing mixed gas section 27.

The outgoing heavy mixed gas line section 27 turns, from its connection with the lower end of the chilling evaporator section 26 at the far side of the refrigerator, across the refrigerator to the near side where it connects into outgoing section 28 which extends vertically downward along the near side of the refrigerator to the absorber. Both of these outgoing sections 27 and 28 form part of the conventional heat exchanger and are therefore preferably bonded respectively to heat exchanger sections 17 and 16 of the incoming hydrogen gas line.

The incoming ammonia feed line, which is composed of sections 30—34, extends from the condenser 12 to feed point 35 at the upper end of freezing evaporator section 21. Section 30 extends from the condenser downwardly along the near side of the refrigerator to a level between walls 5 and 7, where it turns to connect into section 31 which extends horizontally from the near side of the refrigerator to the far side thereof along and in direct physical heat exchange relationship preferably with the outgoing section 27 of the heat exchanger. At the far side of the refrigerator it turns to connect into connector section 32 which slants forwardly upward along the far side of the refrigerator to a point adjacent one end of section 23 of the intermediate portion where it turns to connect into section 33. This section extends from the far side to the near side of the refrigerator where it turns upward to connect into section 34 which extends upwardly to the feed point 35. In this way the incoming ammonia enters the upper end of the freezing evaporator and flows downwardly through its sections 21 and 20 in countercurrent relationship to the hydrogen gas which enters the lower end of the freezing evaporator.

This countercurrent flow relationship favors the production of the lowest obtainable operating temperatures in the freezing sections. In order to change the flow relationship of liquid ammonia and hydrogen gas from countercurrent in the freezing evaporator to concurrent in either the elongate intermediate portion and the chilling evaporator or the chilling evaporator alone, the ammonia is removed from the lower end of the freezing evaporator through an exit opening 36 and fed by transfer line 37 through feed point 38 into the upper end of the intermediate portion as shown, although it may be arranged to bypass that portion and enter the upper end of the chilling evaporator. In either event, it joins the hydrogen gas which enters the intermediate portion at its upper end.

The chilling evaporator normally has an operating temperature gradient which rises gradually from its inlet at the upper end of section 25 to its outlet at the lower end of section 26. The chilling evaporator should be able to maintain the chilling compartment 6 at or below the recommended maximum air temperature of 46° F. under no-load conditions with room temperatures ranging as high as 110° F. The difficulty is that when the performance of the chilling evaporator is such as to maintain the chilling compartment at or below this upper limit, the operating temperatures at the colder end of the chilling evaporator may be so low as to cause frost to form on the adjacent surface of the compartment 6.

The present invention avoids or minimizes the possibility of producing this formation by raising the operating temperature of the colder portion of the chilling evaporator while lowering the operating temperatures of the warmer end thereof without, at the same time, reducing the quantity of useful refrigeration. This is accomplished by providing the colder part of the chilling evaporator with at least one partition dividing its gas stream into an active portion, which flows in operative relationship over the surface of the liquid ammonia in that particular part so as to be available for useful refrigeration, and an inactive portion, which is shielded from contact with the liquid ammonia, and by reuniting both streams in a subsequent and warmer part of the chilling evaporator to form a larger active stream whereby the unspent capacity of the fresh gas thus introduced into the larger active stream is made available for useful refrigeration.

To this end, the colder part of section 25 of the chilling evaporator is horizontally divided by a longitudinal partition 40 into a bottom passage 41 and a top passage 42 which preferably is larger in cross-section than the bottom passage 41. The liquid ammonia entering section 25 will of course pass through the bottom passage 41, while the gas stream composed of hydrogen and ammonia vapor, will enter both passages, forming bottom active and top inactive streams which are herein also designated by the numerals 41 and 42.

Since only a part of the total gas is thus exposed to the liquid ammonia, a corresponding part of the total available heat at the available temperature potential will be sufficient to raise the operating temperatures of the liquid ammonia and the partial pressures of the ammonia vapor up to and maintain them at the values which would normally prevail without any division of the gas stream. However, the remainder of the available heat, over and above the corresponding small part above mentioned, becomes effective to raise the operating temperatures of the liquid ammonia still further and thereby correspondingly increase the rate of evaporation and the resulting ammonia partial pressures sufficiently to bring the system into equilibrium. The net effect is that the capacity is reduced largely in proportion to the reduction in the volume of active gas, while the operating temperatures of the ammonia are correspondingly increased. In this way, the slope of the operating temperature gradient in section 25 is decreased, while the operating temperatures at the colder end of that gradient are increased.

The gas stream may be and preferably is divided by a series of partitions into a longitudinal succession of active streams, each of which is larger than its predecessors, and a corresponding succession of inactive streams, each of which is smaller than its predecessor. Where one active passage is larger than its predecessor, the partition is appropriately offset from the center of the tube and, in the case of partition 40, it is held in its offset position by its marginal flanges 43 which frictionally engage diametrically opposed portions of the tube 25.

Accordingly, the warmer part of section 25 is horizontally divided by longitudinal partition 44 into a bottom passage which is larger cross-sectionally than bottom passage 41, and a top passage which is correspondingly smaller than top passage 42. This partition 44 may begin where partition 40 ends, or it may be spaced somewhat therefrom. It permits some of the fresh gas leaving top passage 42 to enter the bottom passage under partition 44 and thus provide for additional useful refrigeration. The active gas leaving the bottom passage 41 has an ammonia vapor partial pressure which is higher than that existing in the inactive gas leaving top passage 42. Consequently, when part of the inactive gas from top passage 42 enters the bottom passage under partition 44 and there joins with and diffuses into the active gas, there is an immediate lowering of the ammonia partial pressures. This causes the liquid ammonia to evaporate more rapidly, decreasing its operating temperatures rapidly to a new equilibrium value which is reached a short distance from the entrance of the bottom passage. From that new equilibrium point, the operating temperature of the ammonia slowly rises in the normal way.

The initial or colder part of section 26 of the chilling evaporator is likewise divided by partition 45 into bottom and top passages which respectively are larger and smaller than the preceding bottom and top passages. Thus, in the arrangement shown, the cross-sectional area of the bottom passage 41 approximates one-fourth of the cross-sectional area of the tube, while the bottom passages under partitions 44 and 45 respectively approximate fifty and seventy-five percent of the area of the tube. In each case, these partitions extend approximately one-half of the length of the straight portion of the section within which each is located, but it will be understood that longer or shorter partitions, and a greater or lesser number of them may be employed. The partitions may be readily introduced in the tube simply by flattening the tube sufficiently to permit their insertion and then leaving the tube spring back to its original circular cross-section. In this way the partitions are both frictionally held in place and sufficiently sealed along their marginal edges.

Since the last half of section 26 does not contain any partition, the rest of the inactive gas is here made available for useful refrigeration so that the quantity of refrigeration occurring in this part will of course be greater than would be the case if the stream were not divided in the preceding portions of the chilling evaporator. As a consequence, the partial pressures of the ammonia and the operating temperatures in this half are lower than they would be otherwise, while the quantity of useful refrigeration is increased sufficiently to compensate for the reduced quantity of refrigeration in the preceding sections. Accordingly, the total quantity of refrigeration remains the same.

It is possible to precool the incoming hydrogen and ammonia liquids by bonding the feed lines to chilling evaporator sections 25 and 26. However, since the temperature of the colder part of the chilling evaporator is raised by the partition arrangement employed, the degree of precooling is correspondingly lowered or lost. This is objectionable, because precooling to a temperature as low as possible without introducing heat into the freezing evaporator remains highly desirable. I have found that this additional precooling can be obtained without deleteriously affecting the refrigeration of the chilling compartment 6, by interposing between the freezing and chilling evaporators, the elongate intermediate portion formed by sections 23 and 24, and by bonding the incoming hydrogen line section 18 and ammonia liquor section 33 to at least section 23 of the intermediate portion.

The precooling intermediate portion preferably is arranged to function as an intermediate evaporator by directing the liquid ammonia into the upper end of section 23 but this is not essential; hence, if desired, the ammonia may be arranged to bypass the intermediate portion by having the transfer line 37 feed directly into the upper end of the chilling evaporator. The incoming ammonia and hydrogen lines may, if desired, also be bonded to either or both sections 25 and 26 of the chilling evaporator.

With a full-sized experimental unit, having a freezing compartment approximating 1.0 cu. ft., and a chilling compartment approximating 8.0 cu. ft., operating in a room temperature of 110° F. under no-load conditions with a 4" wall insulation around the freezing compartment, I achieved the following performance. Ammonia liquor leaving condenser 12 at 140° F., in passing along the horizontal leg 27 of the gas heat exchanger, drops to 48° F. and then is precooled by the intermediate evaporator to 14° F. at which temperature it reaches feed point 35 to enter the upper end of the freezing evaporator 21—20. The hydrogen gas leaving the absorber at a temperature of 128° F. is cooled by the vertical leg 28 of the gas heat exchanger to 60° F. and by the horizontal leg 27 thereof to 47° F., and then is precooled by the intermediate evaporator to 20° F., at which temperature it enters the lower end of the freezing evaporator 20—21. The heavy mixed gas at the juncture of freezing evaporator sections 20 and 21 has a temperature approximating 5° F. This gas leaves the upper end of the freezing evaporator at a temperature approximating 10° F. at which it enters the intermediate evaporator. It leaves the intermediate evaporator at 18° F. and, during passage through the chilling evaporator, rises to 26° F. Continuing through the horizontal leg 27 of the gas heat exchanger, it rises to 38° F. and, in passing through the vertical leg 28 thereof, rises to 84° F., at which temperature it reenters the absorber 17. Under these conditions the freezing compartment floor wall and ceiling air temperatures and the food compartment center air temperatures respectively are 9½° F., 15½° F. and 46° F.

I claim as my invention:

1. An improved evaporator comprising: an evaporator conduit providing a first active passage for the flow of an active stream of gas and evaporating liquid refrigerant in series with a second active passage for the flow of a larger active stream composed in part of the gas and evaporating liquid refrigerant from the first active passage, the average cross-sectional area of the second active passage being larger than that of the first; and another conduit for feeding relatively fresh gas into said second active passage, said other conduit being arranged to bypass said smaller first active passage and connected to discharge fresh gas into said larger second active passage adjacent to the point where said larger passage receives gas from said smaller passage.

2. An improved evaporator comprising: an evaporator conduit; and a partition extending longitudinally within a portion of said conduit; said conduit and partition cooperating to provide a first inactive passage on one side of the partition for the flow of an inactive stream of gas, a first active passage on the other side of the partition for the flow of an active stream of gas and evaporating liquid refrigerant and a second active passage beyond said partition for the flow of a larger active stream composed of gas from both first passages and of liquid refrigerant from the first active passage; the average cross-sectional area of said second active passage being larger than that of said first active passage.

3. The evaporator of claim 2 including: a succession of longitudinal partitions arranged along the length of a portion of the interior of said conduit to divide it into a corresponding succession of active and inactive passages, each active passage in the direction of gas flow being cross-sectionally larger than the preceding active passage and each inactive passage in the same direction correspondingly being cross-sectionally smaller than the preceding inactive passage.

4. The evaporator of claim 2 wherein: the interior of said conduit is of generally circular cross-section; said longitudinal partition is offset from the center of said conduit; and flanges are provided on said partition to engage diametrically opposite portions of the conduit to hold said partition in its offset position.

5. An improved evaporator comprising: a conduit forming evaporator freezing and chilling sections connected in series for the flow of both gas and an evaporating liquid refrigerant serially therethrough; and a partition extending longitudinally within a portion of said chilling section; said chilling section and partition cooperating to provide a first inactive passage on one sde of the partition for the flow of gas only, a first active passage on the other side of the partition for the flow of both gas and liquid refrigerant and a second active passage beyond said partition for the flow of a larger active stream composed of gas from both first passages and of liquid refrigerant from the first active passage; the average cross-sectional area of said second active passage being larger than that of said first active passage.

6. An improved refrigerator comprising: a cabinet having separate insulated freezing and chilling compartments; a conduit forming an evaporator having elongate freezing, intermediate and chilling sections connected in series for a flow of gas serially through all sections and of an evaporating liquid refrigerant serially through the freezing and chilling sections at least, the freezing and chilling sections being arranged to refrigerate the freezing and chilling compartments respectively, and the intermediate section being substantially insulated from both compartments; and a partition extending longitudinally within a portion of said chilling section conduit; said chilling section conduit and partition cooperating to provide a first inactive passage on one side of the partition for the flow of gas only, a first active passage on the other side of the partition for the flow of both gas and liquid refrigerant and a second active passage beyond said partition for the flow of a larger active stream composed of gas from both first passages and of liquid refrigerant from the first active passage; the average cross-sectional area of said second active passage being larger than that of said first active passage.

7. The refrigerator of claim 6 including: a succession of longitudinal partitions arranged within and along the length of the colder portion of said chilling section conduit to divide it into a corresponding succession of active and inactive passages, each active passage in the direction of gas flow being cross-sectionally larger than the preceding active passage and each inactive passage in the same direction correspondingly being cross-sectionally smaller than the preceding inactive passage.

8. The refrigerator of claim 6 including: conduit means forming separate passages for the separate flow of incoming liquid refrigerant and gas into the freezing section, at least one of said incoming passages being elongated and arranged in direct physical heat transfer relationship along a portion of its length with a substantial portion of said intermediate section.

9. The refrigerator of claim 8 wherein both incoming passages are elongated and arranged in direct physical heat transfer relationship along a portion of their lengths with a substantial portion of said intermediate section.

10. An improved evaporator comprising: conduit means forming evaporator freezing, intermediate and chilling sections connected in series for the flow of both gas and an evaporating liquid refrigerant serially through all sections in the order named, the intermediate section being elongate; and conduit means forming separate feeding passages for the separate flow of incoming liquid refrigerant and gas into the freezing section, at least one of said incoming feeding passages being elongated and arranged in direct physical heat transfer relationship along a portion of its length with a substantial portion of said intermediate section.

11. The evaporator of claim 10 wherein both of said incoming passages are elongated and arranged in direct physical heat transfer relationship along a portion of their lengths with a substantial portion of said intermediate section.

12. The evaporator of claim 10 including: a partition extending longitudinally within a portion of said chilling section conduit and cooperating therewith to provide a first inactive passage on one side of the partition for the flow of an inactive stream of gas, a first active passage on the other side of the partition for the flow of an active stream of gas and evaporating liquid refrigerant and a second active passage beyond said partition for the flow of a larger active stream composed of gas from both first passages and of liquid refrigerant from the first active passage.

13. The evaporator of claim 12 wherein both of said incoming passages are elongated and arranged in direct physical heat transfer relationship along a portion of their lengths with a substantial portion of said intermediate section.

14. An improved evaporator comprising: conduit means forming evaporator freezing, intermediate and chilling sections connected in series for the flow of both gas and an evaporating liquid refrigerant serially through all sections in the order named, the intermediate section being elongate and arranged so that a substantial portion of it extends substantially horizontally; and conduit means forming separate feeding passages for the separate flow of incoming liquid refrigerant and gas into the freezing section, at least one of said incoming passages being elongated and arranged in direct physical heat transfer relationship along a portion of its length with a substantial horizontal portion of said intermediate section.

15. The evaporator of claim 14 wherein both of said incoming passages are elongated and arranged in direct physical heat transfer relationship along a portion of their lengths with a substantial horizontal portion of said intermediate section.

16. The evaporator of claim 14 including: a partition extending longitudinally within a portion of said chilling section conduit and cooperating therewith to provide a first inactive passage on one side of the partition for the flow of an inactive stream of gas, a first active passage on the other side of the partition for the flow of an active stream of gas and evaporating liquid refrigerant and a second active passage beyond said partition for the flow of a larger active stream composed of gas from both first passages and of liquid refrigerant from the first active passage.

17. The evaporator of claim 16 wherein both of said incoming passages are elongated and arranged in direct physical heat transfer relationship along a portion of their lengths with a substantial horizontal portion of said intermediate section.

18. An improved refrigerator comprising: a cabinet having separate insulated freezing and chilling compartments; conduit means forming an evaporator having elongate freezing, intermediate and chilling evaporator sections connected in series for the flow of both gas and an evaporating liquid refrigerant serially through all sections in the order named, the freezing and chilling sections being arranged to refrigerate the freezing and chilling compartments respectively, and the intermediate section being substantially insulated from both compartments and arranged so that a substantial portion of it extends substantially horizontally; and conduit means forming separate passages for the separate flow of incoming liquid refrigerant and gas into the freezing sections, each one of said incoming passages being elongated and arranged in direct physical heat transfer relationship along a portion of its length with a substantial horizontal portion of said intermediate section.

19. In a uniform pressure absorption type of evaporator having elongate tubular freezing, intermediate and chilling sections connected in series for the flow of both gas and an evaporating liquid refrigerant serially therethrough with separate elongate tubular conduits forming separate passages for the separate flow of incoming liquid refrigerant and gas into the freezing section, a method of promoting extremely low operating temperatures in the freezing section while raising the operating temperature within the cooler part of the chilling section comprising: placing at least one of said incoming lines in direct physical heat transfer relationship with a substantial portion of the intermediate section to refrigerate the incoming material of that line by evaporative action; and dividing the flow of gas within the cooler part of the chilling section into an active gas stream of one size which flows along and over the liquid refrigerant and an inactive gas stream which is shielded from the active stream of gas and liquid refrigerant and which flows in side-by-side relationship therewith.

20. The method of claim 19 including: reuniting, in a warmer part of the chilling section, at least a part of said inactive gas stream with said active gas stream to form an active stream of larger size than said active stream of said one size.

21. The method of claim 19 including: placing both incoming lines in direct physical heat transfer relationship with a substantial portion of the intermediate section to refrigerate the incoming materials by evaporative action.

22. A method of reducing the operating temperature gradient within an elongate conduit providing a refrigerating passage having colder and warmer sections for the flow of liquid refrigerant and a stream of inert gas comprising: providing the warmer section of said passage with a larger average flow area than the colder section; conducting the liquid refrigerant through the colder and warmer sections of said refrigerating passage; dividing the gas stream into at least two streams; conducting one of the divided gas streams through the colder section of said passage to provide therein an active stream of gas and evaporating liquid refrigerant; bypassing the other divided stream of gas around the colder section and feeding at least a part of it into the gas discharging from the colder section to provide a larger gas stream; and conducting said larger gas stream through said larger warmer section to provide therein a larger active stream of gas and evaporating liquid refrigerant.

WALTER L. EDEL.

References Cited in the file of this patent
UNITED STATES PATENTS

| Number | Name | Date |
|---|---|---|
| 2,116,998 | Ehnbom | May 10, 1938 |
| 2,167,663 | Lyford | Aug. 1, 1939 |
| 2,167,697 | Thomas | Aug. 1, 1939 |
| 2,267,283 | Lenning | Dec. 23, 1941 |
| 2,269,701 | Ullstrand | Jan. 13, 1942 |
| 2,315,356 | Siedle | Mar. 30, 1943 |
| 2,321,113 | Taylor | June 8, 1943 |
| 2,345,505 | Siedle | Mar. 28, 1944 |
| 2,395,392 | Brace | Feb. 26, 1946 |
| 2,468,104 | Phillips | Apr. 26, 1949 |
| 2,489,752 | Coons | Nov. 29, 1949 |
| 2,508,000 | Sutton | May 16, 1950 |